United States Patent Office 2,786,225
Patented Mar. 26, 1957

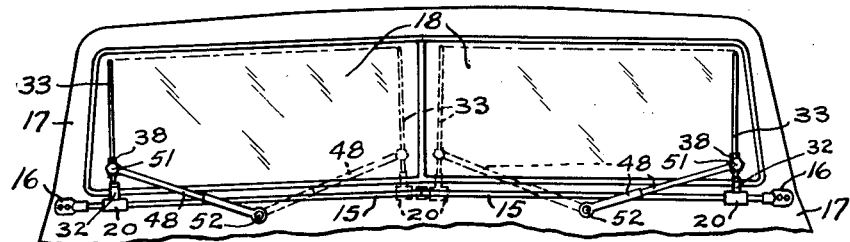
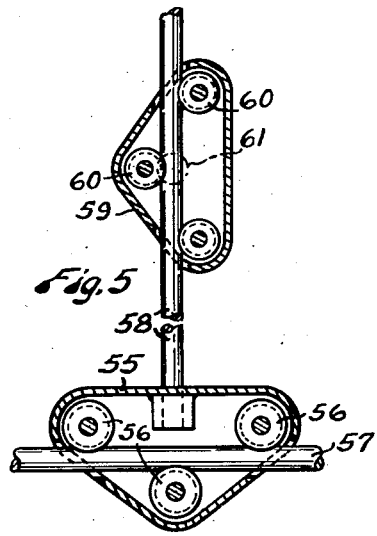
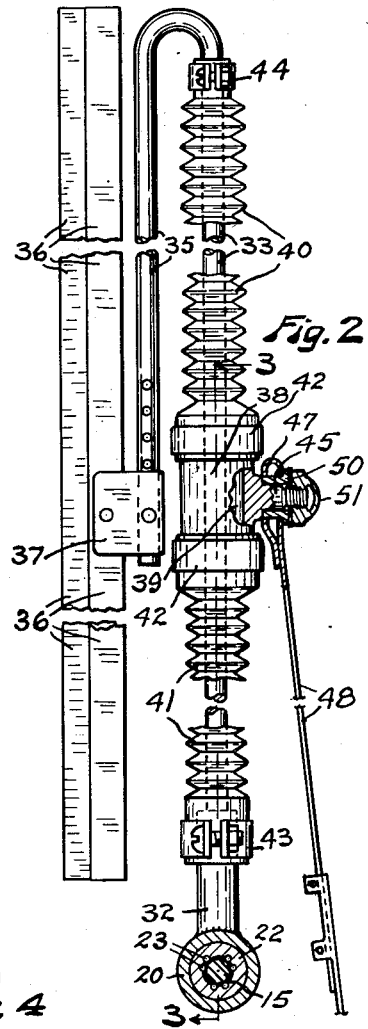
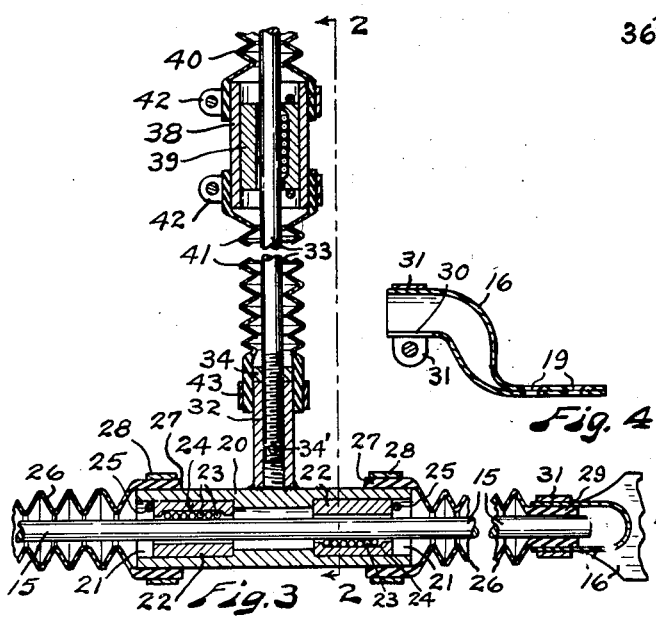
INVENTOR.
Winthrop D. Stites
BY
Fred C. Matheny

2,786,225

WINDSHIELD WIPER

Winthrop D. Stites, Seattle, Wash.

Application October 16, 1952, Serial No. 315,020

3 Claims. (Cl. 15—251)

This invention relates to a windshield wiper and an object of this invention is to provide a windshield wiper in which a substantially vertical wiper blade is reciprocably moved in a straight horizontal direction across and over a major portion of the area of a windshield to provide a maximum area of clear visibility through said windshield.

Another object of the invention is to provide a windshield wiper of this type in which a wiper blade is reciprocably moved over a windshield in a straight horizontal path by means of a novel connection of the wiper blade with the angularly oscillating arm of windshield wiper mechanism of ordinary standard construction.

Another object is to provide a windshield wiper in which carriage devices are mounted on track members by ball or roller bearings which have rolling contact with the track members so that binding of the carriage devices on the track members is obviated and smooth easy reliable operation of the windshield wiper is insured.

Another object is to provide windshield wiper means of this class in which the track members are enclosed in and protected by bellows type shields of elastic material so that the track members are efficiently safeguarded against corrosion and dirt which otherwise might interfere with the ease and smoothness of operation of the wiper means.

Other objects are to provide a windshield wiper of this type which is simple in construction, not expensive to manufacture, reliable, efficient and durable in operation, easy to install on ordinary motor vehicles and not liable to get out of order.

Other objects of the invention will be apparent from the following description taken in connection with the accompanying drawings.

Figure 1 is a somewhat diagrammatic view in front elevation of a divided windshield which is equipped with two wiper devices constructed in accordance with this invention, positions into which the wiper blades may be moved being shown by dot and dash lines, elastic track shields shown in Figs. 2 and 3 being omitted.

Fig. 2 is a view in elevation, with parts shown in section and parts broken away, and taken substantially on a broken line 2—2 of Fig. 3, showing windshield wiper means constructed in accordance with this invention.

Fig. 3 is a sectional view, with parts in elevation and parts broken away, taken substantially on broken line 3—3 of Fig. 2.

Fig. 4 is a detached sectional view of a track mounting clip used in connection with this invention.

Fig. 5 is a detached view, partly in elevation and partly in section and with parts broken away, showing rolling contact carriage means of modified form.

Like reference numerals designate like parts throughout the several views.

The windshield wiper shown in Figs. 1 to 4 comprises a track bar 15 secured by mounting brackets 16 to a motor vehicle 17 and positioned alongside of a windshield 18, preferably directly below said windshield, as shown, or directly above said windshield. Preferably each bracket 16 is formed from a piece of brass tubing bent to the shape shown in Fig. 4 and having holes 19 to receive screws by which the bracket is secured to the motor vehicle.

A wiper blade carriage 20, best shown in Fig. 3, is preferably formed of a tubular piece of metal counterbored at both ends to provide recesses 21 for the reception of two ball bushings 22. Each ball bushing 22 is internally provided with balls 23 which roll in grooves 24 and have rolling contact with the track bar 15. A locking pin 25 is provided to secure each ball bushing 22 in its recess 21. The wiper blade carriage 20 is thus supported and carried on the track bar 15 by ball bearing means which provides rolling contact with the track bar 15 and precludes danger of binding and makes said carriage move easily and smoothly.

Preferably the track bar 15 is shielded and protected by corrugated or bellows type collapsible shields 26 of elastic material, such as rubber and two of which are provided for each track bar 15. Each shield 26 has an enlarged end portion 27 which fits over the adjacent end portion of the carriage 20 and is secured thereto by a clamp 28. The other or outer end of each shield 26 has a thickened portion 29 of reduced diameter which fits snugly over the track bar 15 and extends into the adjacent mounting bracket 16. The end portion of the mounting bracket 16 which receives the thickened shield part 29 has at least one longitudinally extending slot 30 therein and is externally provided with a tightening clip or clamp 31 by which it may be tightened on the shield part 29. The shield part 29 thus serves as an elastic mounting means between the track bar 15 and the mounting bracket 16 and this elastic mounting means reduces vibration and noise and serves as a cushioning member for the track bar 15.

An internally threaded tubular fitting 32 is welded or otherwise rigidly secured to the carriage 20 midway between the two ends thereof and extends at substantially right angles therefrom. A J-shaped blade carrying arm comprising a relatively long straight track part 33 and a blade carrying part 35 parallel with and spaced from said track part and shorter than the track part is carried by the carriage 20. The lower end of the track part 33, as shown in Fig. 3, is threaded into the tubular fitting 32 and is rigidly secured to said fitting 32 as by a lock nut 34 and cross pin 34'. The track part 33 and blade carrying part 35 may be formed by reversely bending a suitable piece of material so as to position the blade carrying part 35 parallel with and spaced from the track part 33 and between the track part 33 and the windshield with the blade carrying part 35 extending back toward the carriage 20. A conventional wiper blade 36 is adjustably attached to the blade carrying part 35 by clip means 37 of the usual form.

A longitudinally reciprocable carriage or slide member 38 is movably mounted on the blade carrying arm 33 by rolling contact means, preferably in the form of a ball bushing 39. Preferably corrugated shields or track covers 40 and 41 of elastic material are fitted over and attached by clamps 42 to the respective end portions of the reciprocable member 38 and serve as track covers on the track part 33. One end portion of the shield 41 extends over the lock nut 34 and adjacent part of the tubular fitting 32 and is secured to the fitting 32 by a clamp 43. The outer end portion of the other corrugated shield 40 is secured by a clamp 44 to the track part 33 of the blade carrying arm. In the interest of clearness the shields 40 and 41 and also shields 26 are omitted from Fig. 1.

The reciprocable member 38 has a pin 45 rigid therewith and extending perpendicularly therefrom and the reversely bent end portion 47 of a driven oscillating windshield wiper actuating arm 48 is pivotally connected with the pin 45 by a bushing 50 and nut 51. The wiper actuating arm 48 is connected with an oscillatory shaft 52 of a suitable conventional windshield wiper motor, not shown. Oscillation of the wiper arm 48 will move the wiper blade 36 across the windshield 18 in a straight path thus making it possible to wipe and keep clean a major portion of the entire area of the windshield. Each windshield wiper actuating arm 48 is capable of exerting sufficient resilient pressure against the blade 36 to keep said blade in proper contact with a windshield as it moves thereover.

In the operation of the windshield wiper device shown in Figs. 1 to 4 oscillation of either windshield wiper arm 48 will move the blade carrying member 33, 35 and the blade 36 carried thereby reciprocably over the windshield 18 between positions as shown by full lines and dot and dash lines in Fig. 1. This will clean a major portion of the area of the windshield and thus make for easier and safer and more comfortable driving. The rolling contact members roll freely on the tracks without binding and with little friction and thus a minimum amount of power for operation of the wiper devices is needed. This makes it practical to use ordinary conventional windshield wiper motors to operate this device which keeps clean almost the entire area of the windshield. Obviously this device may be used without the track covers or shields 26, 40 and 41. However these shields keep the tracks clean and prevent corrosion and are conducive to a better and smoother operating device. The shields 26, 40 and 41 are of thin elastic material and they will compress into a small space and elongate the required amount.

Fig. 5 shows a modified form of carriage 55 having rolling contact means in the form of three small wheels or rollers 56 supporting it for reciprocating movement on a track bar 57. A track part 58 of a wiper blade carrying arm is rigidly attached to the carriage 55. The carriage 55 has the same function as the previously described carriage 20, the rollers 56 function similarly to the ball bushings 20, 22, the track bar 57 is similar to track bars 17 and the track part 58 is similar to the track part 33. A reciprocably movable carriage or slide member 59 having rollers 60 is movably disposed on the track part 58. A pivot member indicated by dot and dash lines 61 is rigid with and extends transversely outwardly from the carriage member 59 and functions in the same manner as the pivot member 45 of Fig. 2 to make connection with the upper end portion of a wiper actuating arm like the arm 48 shown in Fig. 2. The three rollers shown in each carriage 55 and 59 of Fig. 5 provide three point rolling contact with the respective track parts 57 and 58 and the carriage 55 and 59 run easily and smoothly on the track bars and do not bind thereon. The operation of the device shown in Fig. 5 is substantially the same as the operation of the device shown in Figs. 1 to 4.

The foregoing description and accompanying drawings clearly disclose preferred embodiments of this invention but it will be understood that this disclosure is merely illustrative and that changes may be made within the scope and spirit of the following claims.

I claim:

1. A windshield wiper comprising a stationary track bar supported along one edge of a windshield; a wiper blade carriage; ball bushings in said carriage supporting said carriage for reciprocating movement on said track bar; a blade carrying arm having a relatively long straight track part rigid with said carriage and extending outwardly therefrom over the windshield and having a blade carrying part rigid with the outer end portion of said track part and extending back toward the carriage in spaced relation from the track part and between the track part and the windshield; a wiper blade carried by the blade carrying part of said blade carrying arm and engaging with the windshield for movement in a straight path over the windshield; a second ball bushing movable along the track part of said blade carrying arm and between said track part and the blade carrying part of said blade carrying arm; and an oscillating arm extending over the windshield and having one end portion pivotally connected with said second ball bushing.

2. A windshield wiper comprising a stationary track member extending along one edge of a windshield; a wiper blade carriage; reciprocably carried by said track member; a blade carrying arm having a relatively long track part rigid with said carriage and extending outwardly from the carriage over the windshield and having a blade carrying part rigid with the outer end portion of said track part and extending back toward the carriage in spaced relation from the track part and between the track part and the windshield; a wiper blade carried by the said blade carrying part and engaging the windshield; a reciprocable member mounted on the track part of said blade carrying arm and operating between the said track part and the blade carrying part thereof; and an oscillating driven arm extending over the windshield and having one end portion pivotally connected with said reciprocable member.

3. In a windshield wiper, a track bar positioned alongside of a windshield; a wiper blade carriage; rolling contact means mounting said carriage for movement on said track bar; two bellows type tubular elastic shields on said track bar each having one end portion connected with said carriage and the other end portion connected with said track bar at a location outwardly from said carriage; a blade carrying arm rigid with said carriage and extending outwardly therefrom; a reciprocable member; rolling contact means mounting said reciprocable member movably on said blade carrying arm; two tubular elastic shields on said blade carrying arm each having one end portion connected with said reciprocable member and the other end portion connected with said blade carrying arm outwardly from said reciprocable member; and an oscillating arm having one end portion connected with said reciprocable member, whereby said carriage and said blade carrying arm and said reciprocable member are moved back and forth across a windshield.

References Cited in the file of this patent

UNITED STATES PATENTS

| 1,209,785 | Webb | Dec. 26, 1916 |
| 1,325,017 | Hill | Dec. 16, 1919 |
| 1,660,971 | Lindner | Feb. 28, 1929 |
| 1,834,615 | Hancock | Dec. 1, 1931 |

FOREIGN PATENTS

| 592,893 | Germany | Feb. 17, 1934 |
| 607,933 | France | July 12, 1926 |